Aug. 25, 1925.
J. M. TOWLE
1,550,850
PRESSURE HOSE COUPLING
Filed March 2, 1921
2 Sheets-Sheet 2
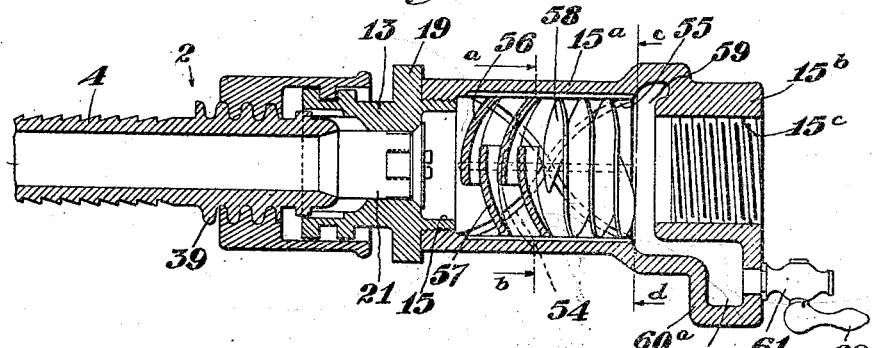
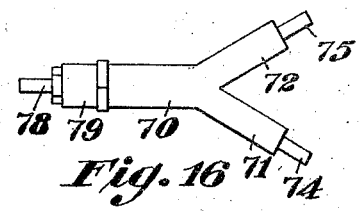
Inventor
James M. Towle.
by Roberts, Roberts & Cushman.
Attorneys Patented Aug. 25, 1925.

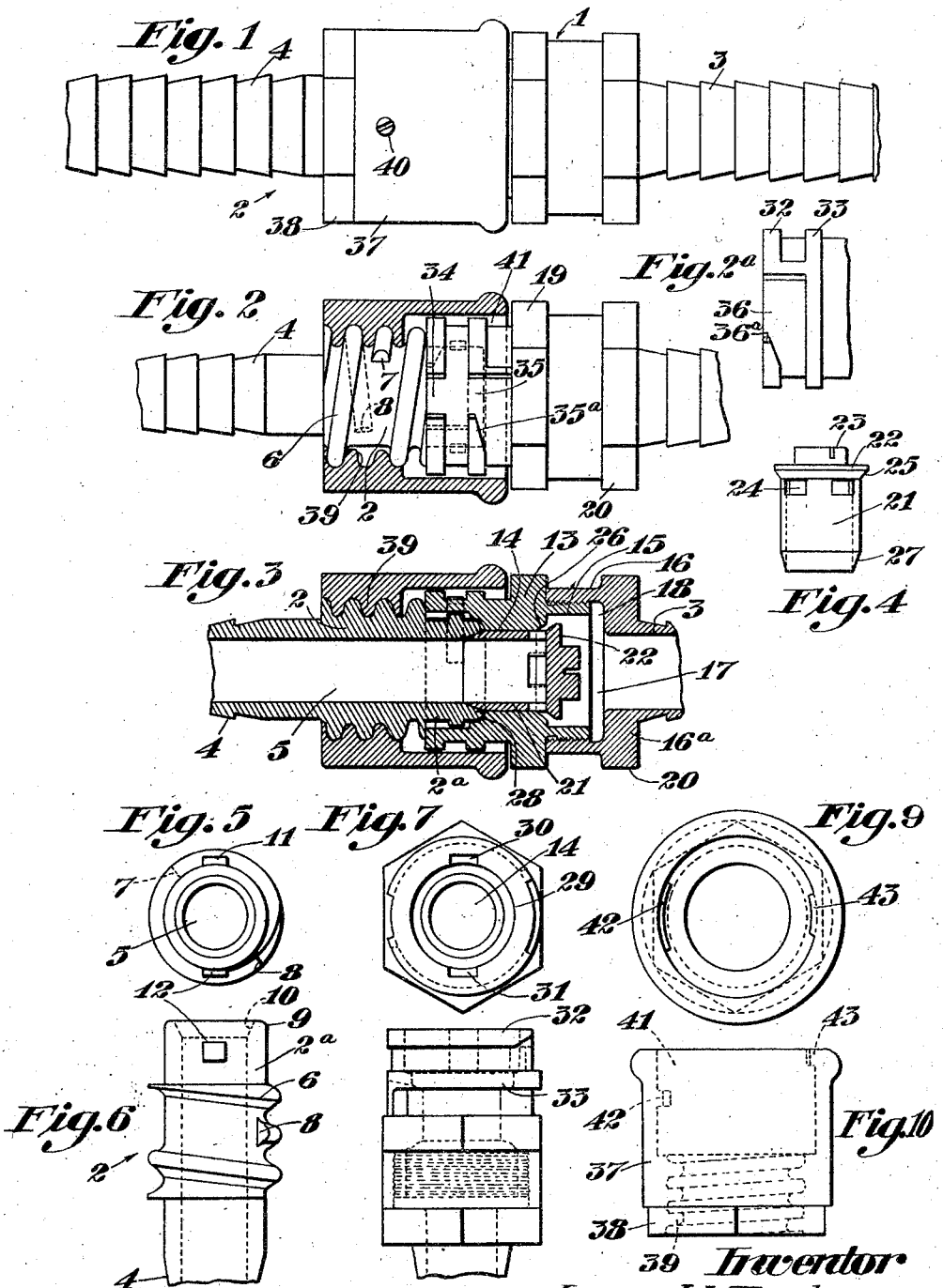
Aug. 25, 1925.  J. M. TOWLE  1,550,850
PRESSURE HOSE COUPLING
Filed March 2, 1921   2 Sheets-Sheet 1
Inventor
James M. Towle.
by Roberts, Roberts & Cushman
Attorneys.

1,550,850

UNITED STATES PATENT OFFICE.

JAMES M. TOWLE, OF WEST SOMERVILLE, MASSACHUSETTS, ASSIGNOR OF ONE-HALF TO LOUIS I. BECKWITH, OF BOSTON, MASSACHUSETTS.

PRESSURE-HOSE COUPLING.

Application filed March 2, 1921. Serial No. 449,132.

*To all whom it may concern:*

Be it known that I, JAMES M. TOWLE, a citizen of the United States, and resident of West Somerville, in the county of Middlesex and State of Massachusetts, have invented new and useful Improvements in Pressure-Hose Couplings, of which the following is a specification.

This invention relates to hose couplings and more particularly to couplings for use with hose for transmitting fluid under high pressure.

In coupling devices for use in connecting such hose, as for example fire hose, or air hose used in the operation of pneumatic tools, it is desirable to provide automatically acting valve means for shutting off the flow of fluid from the supply simultaneously with the disconnection of the coupling elements. As such shut-off valves are usually subjected to the full pressure of the fluid in the supply pipe, it is often found extremely difficult to reconnect the coupling elements, as in order to do so it is first necessary to bring the parts together with sufficient force to move the valve back against the supply pressure and then to hold the parts together while manipulating the interlocking elements of the coupling. This difficulty in manipulation is a serious source of annoyance to the user of such couplings as the air pressures employed may reach six hundred pounds per square inch, and when valves an inch or more in diameter are employed, the force necessary for opening them is relatively large. The principal object of the present invention is to provide for overcoming the above noted difficulty in the use of devices of the character referred to. To this end it is proposed to provide a coupling, in which, by the simple rotation of a part, the coupling member may first be locked together and the valve may simultaneously or subsequently be opened. A preferred means for accomplishing this result may comprise the provision of a rotatable sleeve upon one of said coupling members, such sleeve and member being provided respectively with interengaging cam elements serving upon rotation of said sleeve to impart relative longitudinal movement to the coupling member. The sleeve may also be provided with elements which may, upon rotation, be interlocked with corresponding elements of the other coupling member whereby to prevent separation of such sleeve and member, one of said members serving to house the slidable valve. The interlocking elements of the sleeve and coupling member may if desired comprise radial, internal lugs carried by the sleeve, engageable with circumferential ribs projecting from the coupling member. Stop means may be employed if desired to limit the rotation of the sleeve.

In the connection of coupling members, it sometimes occurs, particularly when the user is in haste, as in the connection of fire hose, that the members are wrongly engaged whereby their proper connection is rendered impossible with attendant loss of time and annoyance to the user. In accordance with the present invention it is desired to make such improper engagement of the members impossible, and to this end the interlocking lugs and ribs of the rotatable sleeve and coupling may be so arranged as to prevent interengagement thereof except in one and the proper relative presentation of the parts. Such lugs and ribs may also be so arranged as to provide engaging surfaces symmetrically arranged as respects the axis of the coupling whereby any tendency of the parts to rock or assume positions at an angle to such axis is avoided.

When couplings are employed in connecting high pressure hose, difficulty is commonly experienced in avoiding leakage at the joint. A further object of the present invention is to overcome this difficulty and to insure a tight joint at the coupling. As one mode of attaining this result the coupling may compose a double seat, that is to say, the two coupling members may be provided with interengaging seat surfaces, and the movable valve member may also be arranged to seat closely against a surface of the opposed coupling member. Thus the fluid must pass both seats in leaking through the coupling joint whereby substantial leakage is eliminated.

As pressure hose is frequently used in long lengths and in situations where it is liable to become twisted or kinked, there is always danger that the torsional strain exerted at a coupling will be sufficient to disconnect the coupling members. A further object of this invention is to provide against such contingency, and for this purpose it is proposed to provide the cooperating coupling members with complemental engaging elements which, irrespective of the position of the locking sleeve, serve to prevent relative rotation of the coupling members. Such complemental members may if desired take the form of a radial lug or lugs projecting from one of said members and engageable with a longitudinal slot or slots in the other thereof.

As it is often desirable to connect lengths of hose of different diameters, it is proposed in accordance with the present invention so to construct the coupling members as to permit their ready interchangeability for others having hose connections of different diameters, and for this purpose it is proposed to furnish coupling elements for both the supply and delivery ends of the hose having hose connections of various diameters.

In the use of air under high pressure, as for driving pneumatic tools, trouble is frequently occasioned by reason of the collection of water condensed from the air. Such water interferes with the proper operations of the tools themselves and when the pipes are exposed to low temperature may freeze, resulting in serious damage to tools or pipes. While it has been proposed to interpose separating devices at intervals in the pipe lines for removing the water, this is not always feasible, as such devices are frequently of a size and weight such as to render them practically immovable and they are thus often omitted from hose lines although their function is a very necessary one. A further object of the present invention is to provide a water separator of a form such as to permit its employment at any desired point and particularly at the dead end of a hose where water is likely to collect. To this end it is proposed to incorporate a water separator in the coupling itself and more especially in that one of the coupling members which terminates the supply pipe or hose and which would commonly be provided with a shut-off valve. Such separator may take the form of a casing forming a continuation of the coupling member and having properly arranged baffle plates and drainage channels together with a discharge cock or valve. If desired the baffle plates may comprise spirally arranged members or overlapping plates or combinations thereof, such plates draining into grooves which may if desired be arranged as illustrated in the co-pending application of J. M. Towle, Serial No. 366,593, filed March 17, 1920.

A preferred embodiment of means for carrying the present invention into effect is illustrated in the accompanying drawings in which,—

Fig. 1 is a side elevation of a coupling made in accordance with the present invention showing the coupling elements connected.

Fig. 2 is a view generally similar to Fig. 1, but showing the connecting member in section.

Fig. 2ª is a fragmentary detail illustrating one of the coupling members shown in Fig. 2 but from the diametrically opposite side.

Fig. 3 is a longitudinal section of the device shown in Fig. 1.

Fig. 4 is a side elevation of a valve member employed in connection with the coupling.

Fig. 5 is an end elevation, and Fig. 6 a side elevation of one of the separable coupling members.

Fig. 7 is an end elevation, and Fig. 8 a side elevation of the other of said coupling members.

Fig. 9 is an end elevation, and Fig. 10 a side elevation of the adjustable connector member employed.

Fig. 11 is a longitudinal cross-section similar in general to Fig. 3, but illustrating a modified form of the device.

Fig. 12 is an elevation taken from the right-hand end of Fig. 11.

Fig. 13 is a transverse cross-section on the line a—b of Fig. 11.

Fig. 14 is a similar cross-section on the line c—d of Fig. 11.

Fig. 15 is a fragmentary longitudinal cross-section illustrating a modified arrangement for the right hand portion of the device shown in Fig. 11; and Fig. 16 is a side elevation partly in cross-section and to smaller scale illustrating a further modification of the device.

As shown in Figs. 1, 2 and 3, the coupling device comprises a pair of separable coupling members, indicated generally at 1, 2, respectively, having projecting from opposite ends thereof hose attaching elements 3, 4. These hose attaching elements may as usual be in the form of short tubes ribbed or corrugated upon their exterior surfaces for the attachment of a hose thereto. The coupling member 2 is of substantially cylindrical form having an interior longitudinal bore 5, and provided upon its exterior surface with a cam member preferably in the form of a helical rib 6. This rib may take the form of a heavy screw-thread extending along a substantial portion of the coupling member but provided at a point intermediate its length with a gap defined by the surfaces 7, 8 respectively, such gap being of substantially a semi-circumference in extent. The cam member 6 terminates short of the end of the coupling member thus providing a substantially cylindrical portion 2ª. This portion terminates in an exterior end surface 9 which may be of curved section if desired, and in an interior end surface 10 forming a seat for a valve member hereinafter described. At points substantially dimetrically opposite, lugs 11, 12, are arranged to project from the surface of the portion 2ª of the coupling member 2. The coupling member thus described is preferably that to which the delivery end of the hose is attached, while to the coupling member 1 is secured the supply end of the hose.

The coupling member 1, as herein shown, comprises a cylindrical portion 13 having a bore 14 and an externally screw threaded flange 15 projecting from its end. The flange 15 has threaded engagement with a flange 16 formed upon a cap member 16ª. The hose connection 3 is shown as formed integrally with this cap, but if desired might be made as a separate element and suitably attached thereto. Within the flanges 15, 16 is formed a chamber 17 having a shoulder 18 for a purpose hereinafter to be described. Both the members 13 and 16ª are preferably provided with nut elements such as 19, 20, respectively, for engagement by a wrench whereby such parts may be secured together firmly, these parts in the normal operation of the coupling being inseparable. 21 is a cylindrical valve member slidable within the bore in the member 13, such valve member comprising a head 22 provided, if desired, with a slot 23 for engagement by a screw driver. By means of this slot the valve member may be turned manually for grinding the valve seat if it should become worn or eroded.

The valve member 21 is hollow, and leading through the walls thereof are a series of ports 24. The head 23 has a beveled outer face 25 for engagement with a seat surface 26 formed upon the member 13. When resting upon this seat the valve serves to close communication between the supply pipe and the outlet end of the coupling member 1, the fluid pressure upon the top of the valve being sufficient to firmly seat the valve in closed position. The member 13 is also provided with an annular seat 28 for engagement by the surface 9, above described, at the end of the coupling member 2. The seat surface 28 and the surface 9, when the coupling members are secured together, cooperate to form a tight joint between such members. The valve member 21 is provided at its extremity with an exterior beveled face 27, such face cooperating with the seat 10 of the coupling member 2 to form a closed joint therebetween. Thus when the parts are in the position shown in Fig. 3, a tight joint is formed both between the latter and the coupling member 1, so that any probability of leakage through the coupling is substantially eliminated.

The outer end of the member 13 is provided with a bore of a larger diameter, as indicated at 29, for the reception of the cylindrical portion 2ª of the coupling member 2. The outer portion of the member 13 is also provided with diametrically disposed slots 30, 31 respectively, upon its interior surface, such slots serving for the reception of the lugs 11, 12 respectively of the coupling member 2. When the coupling members are arranged in cooperative relation with the lugs 11, 12 engaging the slots 30, 31 respectively, it is manifestly impossible to impart any relative rotational movement to such coupling members, the lugs and slots thus serving as locking means to prevent any such annular movement.

Upon the outer surface of the member 13, adjacent its outer extremity, are provided a pair of circumferential ribs 32, 33, these ribs being spaced apart in an axial direction, as indicated in Fig. 8. The rib 32 is provided with a gap 34 (Fig. 2) and the rib 33 with the corresponding gap 35, such gaps being in alignment and of substantially equal width. At a point diametrically opposite the gap 34 the rib 32 is provided with a second gap 36 of substantially greater circumferential length than the gap 34. If desired, one end wall of the gaps 35 and 36 respectively may be formed as beveled surfaces such as 35ª, 36ª respectively.

The means for locking the coupling members together consists of a connector in the form of a sleeve 37. This sleeve may, if desired, be provided at one end with an integral nut 38 for the application of a wrench thereto in tightening the coupling. Upon the interior of the sleeve 37 is formed a helical rib or cam member 39 comprising a screw thread of substantially the same pitch as that of the thread 6, such cam member engaging with the rib 6 of the coupling member 2. At 40 is indicated a stop screw passing through a suitable threaded opening in the sleeve 37, and engageable with the ends 7, 8 of the separated portions of rib 6, whereby such stop screw serves to limit the rotational movement of the sleeve 37 relative to the coupling member 2. Near its outer extremity, as indicated in Fig. 2, the sleeve 37 is provided with a bore 41 of enlarged diameter for the reception of the end portion of the member 13 of the coupling 1. A pair of lugs 42, 43 project inwardly from the surface of the bore 41, said lugs being spaced apart in an axial direction and being arranged substantially diametrically opposite one another (see Figs. 9 and 10). The lugs 42, 43 are of different circumferential lengths, corresponding substantially to the widths of the gaps 36 and 34 in the rib 32, above-described.

In the modified form of the device illustrated in Fig. 11, the coupling member 2 and associated parts is substantially identical with that previously described. The member 13 of the coupling member 1 is also substantially like that described, as also the valve member 21. In place of the cap member 16ª, however, there is substituted an elongated cylindrical casing 15ª, having screw threaded engagement with the flange 15. This casing at its right-hand extremity, as seen in Fig. 11, may be provided with an extension 15ᵇ having an integrally threaded bore 15ᶜ for the attachment of a supply pipe. In a preferred form, however as indicated in Fig. 15, the casing 15ª may terminate in a portion provided with an integral hose connection 3ª of substantially the type illustrated in Fig. 1. Upon the interior of the casing 15ª are provided a plurality of longitudinal grooves such as 50, 51, 52 and 53, respectively, and a second set of grooves such as 54, 55, of substantially spiral or helical form. A series of overlapping baffle plates 56, 57 are also provided, such baffle plates extending outwardly from opposite sides of the casing and providing between them a tortuous passage for the air. If desired, such overlapping plates may at one portion of the casing be replaced by a spiral baffle plate 58 which may or may not be continuous from end to end as desired. The several grooves above enumerated terminate at the right-hand end of the casing, as seen in Fig. 11, in a chamber 59 which communicates with a chamber 60 formed in a boss 60ª projecting from one side of the casing near its end. A drain cock 61 having a handle 62 may be secured in a suitable opening in the boss 60ª whereby moisture collecting in the chamber 60 may be drained therefrom.

In the form of device shown in Fig. 16, the casing 15ª is replaced by a generally similar casing 70 but having instead of a single hose connection as 3ª, divergent portions 71, 72 terminating in supply-hose connecting elements 74, 75, respectively. The casing 70 may be secured as by means similar to that illustrated in Fig. 11, and herein indicated generally at 79, to a single discharge-hose connecting element 78.

In the normal operation of the device shown in Figs. 1 to 10, respectively, and with the coupling members separated, it being understood that the hose connection 3 is attached to an air-pressure line, the valve member 21 will be seated, due to the air pressure upon its head, with the surface 25 engaging the surface 26. The coupling member 2 will now be brought into alignment with the coupling member 1. In bringing these parts into engagement it is necessary that the lug 43 be brought opposite the gap 34 in the rib 32, and thus the proper initial position of the coupling members is assured. The sleeve 37 is now pushed axially over the member 13, the lug 43 passing successively through the gaps 34, 35 while the lug 42 passes through the gap 36. Upon a slight rotation of the sleeve 37 relative to the member 32, the lugs 42, 43 are carried respectively over the inclined surfaces 35ª, 36ª and behind the ribs 33, 32, respectively. As thus positioned, it is evident that the coupling elements are retained against separation in an axial direction. The sleeve 37 is now further rotated to the extent permitted by the stop screw 40. During such rotation, as the lug 42 lies between the ribs 32, 33, it is evident that there can be no substantial relative movement in an axial direction of the coupling member 1 and the sleeve 37. The engaging cam elements 6 and 39 thus serve forcibly to draw the coupling member 2 inwardly and into engagement with the coupling member 1. Such inward movement brings the seat 10 into engagement with the surface 27 of the valve 21, thus readily pushing the valve open against the fluid pressure in the supply hose even when the pressure is of the order of 600 pounds per square inch, and the valve be an inch or more in diameter. The provision of the shoulder 18 serves however, under all conditions of use to prevent dropping of the valve 21 from the bore 14. The normal movement of the valve 21 to fully opened position is relatively slight, and by reason of the screw like arrangement of the cam members 6 and 39, it is relatively easy to secure the necessary force for unseating the valve. When the valve has been fully unseated the surface 9 of the coupling member 2 is brought into firm engagement with the seat 28 of the coupling member 1, and thus as above described, leakage between the parts is avoided.

By the provision of lugs 42, 43 upon opposite sides of the sleeve 37 it is possible to secure opposed bearings against the outer surface of the coupling member 13, and thus any tendency of the parts to rock about the longitudinal axis of the device is substantially eliminated. It is also clear that the engagement of the lugs 11, 12 with the slots 30, 31 serve to prevent angular rotation of the coupling members relative to one another, even though the sleeve 37 should not be tightened to its fullest extent so that kinks in the hose line are ineffective to unlock the two coupling elements.

In the commercial production of the device shown herein it is proposed to provide coupling elements such as 1, 2 with hose attaching means for securing thereto hose of different diameters, and thus by merely interchanging one or the other of the coupling elements for a similar element having a hose-attaching means of a different diameter it will be readily possible to secure together lengths of hose of different diameters.

Referring to the device of Fig. 11, the operation of the coupling is substantially as above described, but in order to eliminate water which may be condensed in the pipe-line or hose, the coupling has been provided with a separator device consisting of the casing 15ª and associated parts. With this arrangement any water condensed in the supply hose will be caught by the baffle plates in the casing 15ª, and caused to flow into the channels formed by the various grooves described. Such an arrangement of parts for eliminating condensed water is extremely efficient in use as has been pointed out in the co-pending application of James M. Towle, filed March 17, 1920, Serial No. 366,593 in which a condensing device of generally similar type has been disclosed. In the present device, however, wherein the condenser has been arranged to form a part of the hose coupling, it is evident that such condenser may be employed at any desired point in a pipe-line and without substantially affecting the freedom of movement of such pipe-line from place to place. Water condensed in the casing 15ª may be drained therefrom through the drain cock 61 and in the ordinary use of the device such drain cock would be opened for a short period prior to the attachment of a line of hose by means of the coupling elements and thus any tendency to drive condensed water through the attached hose and into the air operated tool is prevented.

Having thus described the invention in a preferred embodiment of the same, together with the mode of use thereof, what I claim and desire to secure by Letters Patent of the United States is:—

1. A hose coupling comprising a pair of separable members, a sleeve rotatably mounted upon one of said members, interengaging helical cam elements upon the opposed surfaces of said sleeve and its coupling member, and means for limiting the angular movement of said sleeve.

2. A coupling member comprising a sleeve having a circumferential outstanding rib adjacent its extremity, a second circumferential rib spaced axially from said outer rib, said ribs having aligned gaps therein, and said outer rib having a second gap of greater circumferential length than its first named gap and diametrically opposed thereto.

3. A coupling device including a pair of interfitting coupling members having interlocking parts to prevent their relative rotation and a sleeve member enclosing the interfitting joint of the coupling members, one of the coupling members having circumferentially extending guides and the other of the coupling members having helical cam portions, and the sleeve having interiorly projecting portions respectively engaging the guides and cam for drawing the parts together.

4. In a coupling device, a coupling member having an interrupted helical cam portion and a connector sleeve having inward projections cooperating with the cam portion and an additional projection engageable in the space formed by interruption of the cam, said latter projection limiting the relative movement of the sleeve and coupling member.

5. A coupling device comprising a pair of cylindrical coupling members, one of said members having an enlarged bore and the other having a reduced terminal portion fitting the bore, said bore and reduced portion having interengaged slot and lug portions for locking the parts against relative rotation, one of the coupling members having an outwardly projecting inclined cam rib and the other having a non-inclined projecting peripheral rib, and a coupling sleeve having a portion interlocking with the inclined cam rib and a portion interengaged with the peripheral rib for securing and drawing the parts together.

6. A coupling device comprising a pair of cylindrical coupling members, one of said members having an enlarged bore and the other having a reduced terminal portion fitting the bore, said bore and reduced portion having interengaged slots and lug portions for locking the parts against relative rotation, one of the coupling members having an outwardly projecting inclined cam rib, and the other having a non-inclined projecting peripheral rib, and a coupling sleeve having a portion interlocking with the inclined cam rib and a portion interengaged with the peripheral rib for securing and drawing the parts together, and means securing the sleeve to one of the parts for rotative movement relative thereto.

7. A coupling device comprising a pair of cylindrical coupling members, one of said members having an enlarged bore and the other having a reduced terminal portion fitting the bore, said bore and reduced portion having interengaged slot and lug portions for locking the parts against relative rotation, one of the coupling members having an outwardly projecting inclined cam rib and the other having a noninclined projecting peripheral rib, and a coupling sleeve having a portion interlocking with the inclined cam rib and a portion interengaged with the peripheral rib for securing and drawing the parts together, and means securing the sleeve to one of the parts for limited rotative movement relative thereto.

8. A coupling device including a pair of cylindrical coupling members, one of said members having an enlarged terminal bore, said member having radial outwardly extending ribs, the other coupling member having a portion for interfitting engagement with the enlarged bore of the first and having outwardly extending cam ribs and a connector sleeve secured on the second coupling member for limited rotation relative thereto, said sleeve having portions cooperating with the cam rib of the second coupling member and having inwardly extending lugs for engagement with the ribs of the other coupling member, the interfitting extension of the second coupling member having projecting lug portions and the first coupling member having grooves in the walls of its bore to receive said lugs and having exterior slots through its cam ribs to receive the lugs of the connector sleeve, whereby the parts may be longitudinally brought into interfitting engagement, and the fitting of the lugs in the grooves will hold the coupling members against relative rotation while the engagement of the lugs on the sleeve with the ribs will connect the sleeve for rotation relative to the parts, substantially as and for the purpose described.

9. A device of the class described comprising cooperating coupling members, one of said members having an axially extending slot and the other a lug engaging the slot to prevent relative rotation of the parts, a sleeve having threaded engagement with one coupling member, means for limiting relative rotation of the sleeve and coupling members to less than a full revolution, a radial rib upon the second coupling member, and means carried by the sleeve and engageable with the rib to prevent relative axial movement of the sleeve and the second coupling member.

10. A device of the class described comprising cooperating coupling members, an automatic shut-off valve carried by one of said members, a sleeve having threaded engagement with the second coupling member, means limiting relative rotation of the sleeve and its coupling, a circumferentially extending locking element carried by the valved coupling member, and a cooperating locking element carried by the sleeve and engageable with the first element by successive axial and rotational movements.

11. A device of the class described comprising a pair of complemental coupling members, an automatic shut-off valve carried by one of said members, a sleeve having a lug, a circumferential rib upon the first coupling member having a passage through which the lug may be passed by relative axial movement of the sleeve and rib, the lug being constructed and arranged to be positioned behind the rib to prevent axial separation of the sleeve and rib, and means operative upon rotation of the sleeve relative to the coupling upon which it is mounted to draw an element of said coupling into engagement with the valve to open the latter.

12. A device of the class described comprising a pair of complemental coupling members, an automatic shut-off valve carried by one of said members, a sleeve arranged to rotate relatively to one of said coupling members but restrained against axial movement relatively thereto when the couplings are connected, and means interposed between the sleeve and the second coupling member constructed and arranged to move said couplings toward each other upon relative rotation of the sleeve and the second coupling member thereby to engage the latter coupling with the valve and open the latter.

13. A device of the class described comprising a pair of coupling members, one of said members having an automatic normally closed shut-off valve, a rotary sleeve mounted upon one of the coupling members, means limiting movement of the sleeve to less than a complete rotation, means carried by the sleeve engageable with a circumferentially extending element of one coupling member to prevent relative axial movement of the latter and the sleeve, and interengaging helical cam elements carried by the sleeve and the other coupling member whereby upon rotation of the sleeve the coupling members are drawn toward each other and the valve opened.

Signed by me at Boston, Mass., this 19th day of February, 1921.

JAMES M. TOWLE.